(12) United States Patent
Asquith

(10) Patent No.: US 7,203,605 B2
(45) Date of Patent: Apr. 10, 2007

(54) FLOW SENSING IN MULTIPLE CONDUITS

(75) Inventor: Peter Asquith, Stonehouse (GB)

(73) Assignee: ABB Limited (GB)

( * ) Notice: Subject to any disclaimer, the term of this patent is extended or adjusted under 35 U.S.C. 154(b) by 257 days.

(21) Appl. No.: 10/396,711

(22) Filed: Mar. 26, 2003

(65) Prior Publication Data
US 2004/0030521 A1    Feb. 12, 2004

(30) Foreign Application Priority Data
Mar. 28, 2002  (GB) ................................ 0207407.8

(51) Int. Cl.
*G01F 1/00*    (2006.01)

(52) U.S. Cl. ...................................................... 702/45

(58) Field of Classification Search ................. 702/45; 324/442; 137/88; 73/861.22; 340/870.01; 75/10.4; 222/61
See application file for complete search history.

(56) References Cited

U.S. PATENT DOCUMENTS

| | | | | |
|---|---|---|---|---|
| 3,701,006 A | * | 10/1972 | Volkel et al. | 324/442 |
| 3,739,799 A | * | 6/1973 | Bickford et al. | 137/88 |
| 4,601,336 A | * | 7/1986 | Dilgren et al. | 166/252.1 |
| 5,370,269 A | * | 12/1994 | Bernosky et al. | 222/61 |
| 5,550,537 A | * | 8/1996 | Perdue | 340/870.01 |
| 6,372,010 B1 | * | 4/2002 | Shver et al. | 75/10.4 |

FOREIGN PATENT DOCUMENTS

JP     3100314 A    4/1991

* cited by examiner

*Primary Examiner*—John Barlow
*Assistant Examiner*—Aditya S. Bhat
(74) *Attorney, Agent, or Firm*—Stites & Harbison, PLLC; Ross F. Hunt, Jr.

(57) ABSTRACT

A method of obtaining a plurality of measures of quantity of a substance flowing through a respective plurality of conduits is disclosed, wherein each of the conduits is supplied from an upstream common source location. An improved series of measurements are derived from an upstream absolute measure and downstream relative measures.

43 Claims, 2 Drawing Sheets

FLOW SENSING IN MULTIPLE CONDUITS

Figure 1:
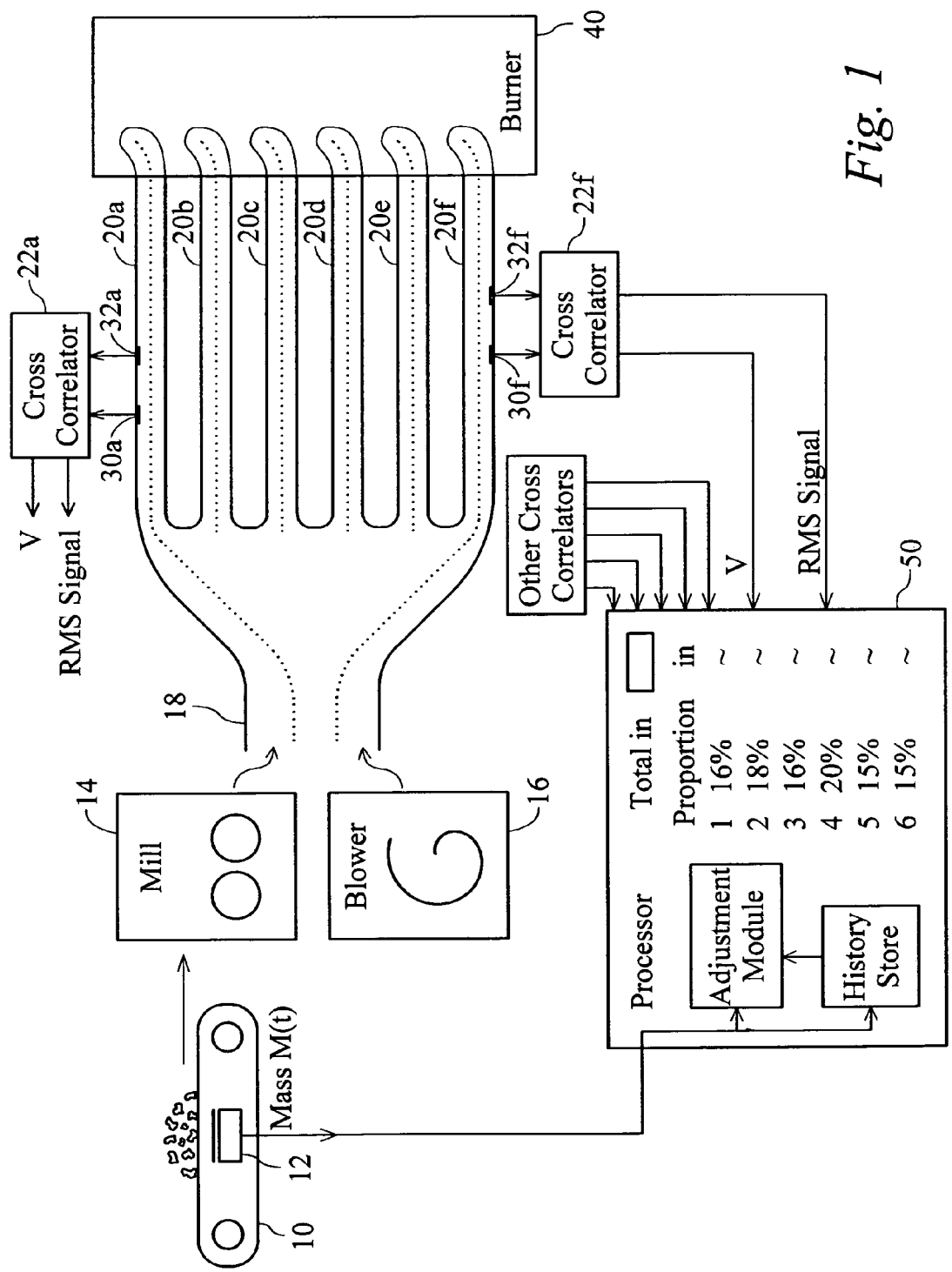

The present invention relates to metering of fluids. The invention is particularly concerned with the problems that arise in metering pulverised fuel supplied from a common source to multiple conduits to a burner but the solution proposed by the invention has application to other areas where a source conduit feeds multiple downstream conduits.

In a pulverised fuel burner, fuel is generally pulverised and then carried in a stream of fast flowing air in a large conduit which is subdivided into multiple conduits which feed different burner inputs. It is desirable to know both the total fuel flow and also the flow in each individual conduit. The applicant has provided solutions to this problem, making use of electrodes embedded in the walls of the conduits which sense the charge passing the electrodes. Charge is accumulated on the fuel particles as a result of friction in a seemingly random manner and so the charge passing an electrode in the pass of the fluid will vary with time. If two spaced apart electrodes are positioned in the path of the fluid, then, although the signal from each electrode is essentially a random noise signal, the signals will be correlated and from the time delay at which maximum correlation is found and the spacing of the electrodes, a measure of the velocity of the fluid can be obtained. The applicant has successfully implemented this principle to obtain useful measures of fluid velocity in such cases.

It is, however, difficult to measure the absolute amount of solids passing through the measurement location. The magnitude of the signal from the electrodes is related to the amount of solids passing any given point, the greater the amount of particles, the greater the RMS signal strength. Thus it might be considered that a measure of solid quantity may be obtained by multiplying the RMS signal level by a scale factor determined from calibration. However, it has been found that the absolute value of the RMS signal strength cannot reliably be directly calibrated to give a volumetric measure as the signal strength is dependent on other factors, including particle size, precise nature of the material and relative humidity, among others.

Nevertheless, the applicant has found that a useful relative measure of the proportion of solid passing down each of multiple similar conduits can be obtained by measuring the RMS signal levels for each conduit. Whilst changes in substance conditions may affect the absolute value of the RMS signal level, all conduits should be affected similarly, particularly in the case where the conduits are similar or of substantially identical dimensions. A simple but effective method is simply to assume that the RMS signal level is directly linearly proportional to the amount of fluid in a conduit at any given time and so the proportion of solid passing through a particular conduit is simply the RMS signal for that conduit divided by the sum of the RMS signal for all conduits supplied from the common source.

More recently, we have found that the signal level can in fact be more accurately related to parameters of the fluid flow and this is the subject of a separate patent application. However, for the purposes of the present invention, the precise manner in which a measure of the proportion of fluid is derived from the signals is not critical.

It would be more useful to have absolute measures of flow, for example, in terms of mass of fuel flowing through each conduit to the burner. As mentioned, this cannot be reliably achieved simply using the RMS signal magnitude. Other meters for measuring mass flow are not suitable for such an application and, in any event would be expensive to implement for multiple conduits. The invention seeks to address the problem of obtaining multiple measurements of quantity of substance in a plurality of conduits fed from a common source.

According to a first aspect, the invention provides a method of obtaining a plurality of measures of quantity of a substance flowing through a respective plurality of conduits, each of the conduits being supplied from a common source location, the method comprising:

obtaining a measure of the total quantity of substance flowing past the common source location;

obtaining relative measures of the proportions of substance flowing through each of the plurality of conduits at respective measurement locations in each conduit downstream of the source location;

obtaining measures of the quantities of substance flowing through each of the respective plurality of conduits based on the total quantity of substance flowing past the source location and the relative proportions of substance flowing through each of the plurality of measurement conduits.

In this way, a single, relatively accurate, absolute measure of quantity can be obtained from a single measuring device optimised for the purpose and the relative measurements obtained from the sensors in each measurement conduit can then be converted into absolute measurements based on this upstream absolute measurement.

At first sight, this might appear counter-intuitive as a measurement taken at the source location will not relate to the substance passing at the same instant in time as the downstream measurements in each conduit are taken However, in the steady state case, provided changes in the total amount of substance flowing are not rapid or there are no significant changes, the method can provide a useful indication of total quantity of substance flowing through each conduit This applies to the case of a pulverised fuel burner.

In a further development, the method further comprises compensating the measurements of quantity flowing in each conduit for delays between measurements of total quantity of substance at the source location and the corresponding quantity of substance passing the downstream measurement locations.

In one implementation, a short-term absolute value for the quantity of substance in each conduit may be derived based on the relative measures of the quantity of substance in each measurement conduit and a predetermined scale factor. In this way, although it is known that the relative measures cannot provide an accurate long-term measure of absolute quantity, short term fluctuations may be captured more reliably than based on the upstream source measure. The scale factor is chosen or adjusted based on the upstream measurement.

From another perspective, in an improved implementation, the method involves scaling an absolute value of quantity of substance based on measures of proportions of substance flowing through the measurement conduits wherein the sum of the proportions is permitted to fluctuate from unity. The sum of the proportions should tend towards unity. This can be achieved by providing feedback to adjust scale factors applied to relative measurements so that the proportions tend towards unity. The time constant should be sufficiently short that major drifts in the amount do not occur but sufficiently long that short term fluctuations can be measured by the downstream measurement detectors.

From yet another perspective, the method preferably entails providing a plurality of downstream measures of quantity based on scaling an absolute measure of source quantity by relative measures of quantity in the downstream measurement conduits wherein the sum of the quantities measured in the downstream quantities is permitted to deviate from the source quantity based on the delay characteristics of the system.

In a closely related aspect, the invention provides a method comprising deriving a plurality of relative amounts of substance flowing through a plurality of similar measurement conduits from a respective sensor in each conduit, wherein the sensors produce an approximate measure of absolute quantity of substance in each conduit;

producing a measure of absolute quantity of substance in each conduit based on the measured relative quantities and based on adjusting the approximate absolute measures of quantity to correspond to an upstream measure of absolute total quantity of substance measured at a source location.

The above improvements to the basic method work well at coping with short term fluctuations. However, pursuant to the invention, it has been appreciated that these refinements are less well suited to coping with drastic changes. By way of non-limiting example, in the case of a pulverised fuel boiler, when the boiler is started or stopped the flow of substance measured at an upstream location may change abruptly to or from a high level to zero or vice versa. There will normally be a delay before this change gets propagated through to the actual flow of the measurement conduits. Thus, for example, when the fuel supply is first started, a relatively high measure of total substance flow may be obtained even though little if any substance has propagated through to the measurement conduits. Similarly, when the boiler is stopped, the readings may suddenly drop to zero although substance is still flowing through the measurement conduits and will take some time to decay.

To overcome this problem, preferably the upstream measurement of total quantity of substance is temporally filtered. In one embodiment, the upstream measure of quantity is used to adjust the measurements of absolute quantity from each measurement conduit while the upstream measurement indicates a steady state flow. If the upstream measurement indicates a sudden change, adjustment of the downstream measurements may be suspended or the effects of the upstream measurement may be diminished. In certain cases, it may be possible to model the behaviour of the system in response to changes in the amount of substance flowing at the upstream location and use an estimate of the amount of substance flowing at the downstream location to correct the absolute measures of quantity. In a particularly preferred and effective implementation, the upstream measurement is only used to adjust the downstream measurement if it satisfies a predetermined condition, preferably a flow rate above a minimum threshold for a predetermined period. For example, a flow of at least 20%, more typically 25%, typically at least about 40% of a defined "normal" flow for a period of at least five minutes, typically 10 minutes, preferably at least 15 minutes, typically at least about 30 minutes. These limits may be varied depending on the circumstances and design of the system. For a pulverised fuel boiler, it is found most preferable to require at least about 40% flow for at least about 30 minutes before the upstream flow measurement is taken into account, particularly in the preferred case where the upstream measurement is taken before the fuel is entrained in a stream of air (or other gas; the air may be enriched or processed if required). In a most preferred application, the measurement is taken before fuel is supplied to a mill for pulverising the fuel, preferably from the mass of fluid supplied to a conveyer feeding one or more mills which supply the fuel.

The invention extends to apparatus for performing the above methods and to computer programs or computer program products for carrying out the processing of measurements.

Figure 2:
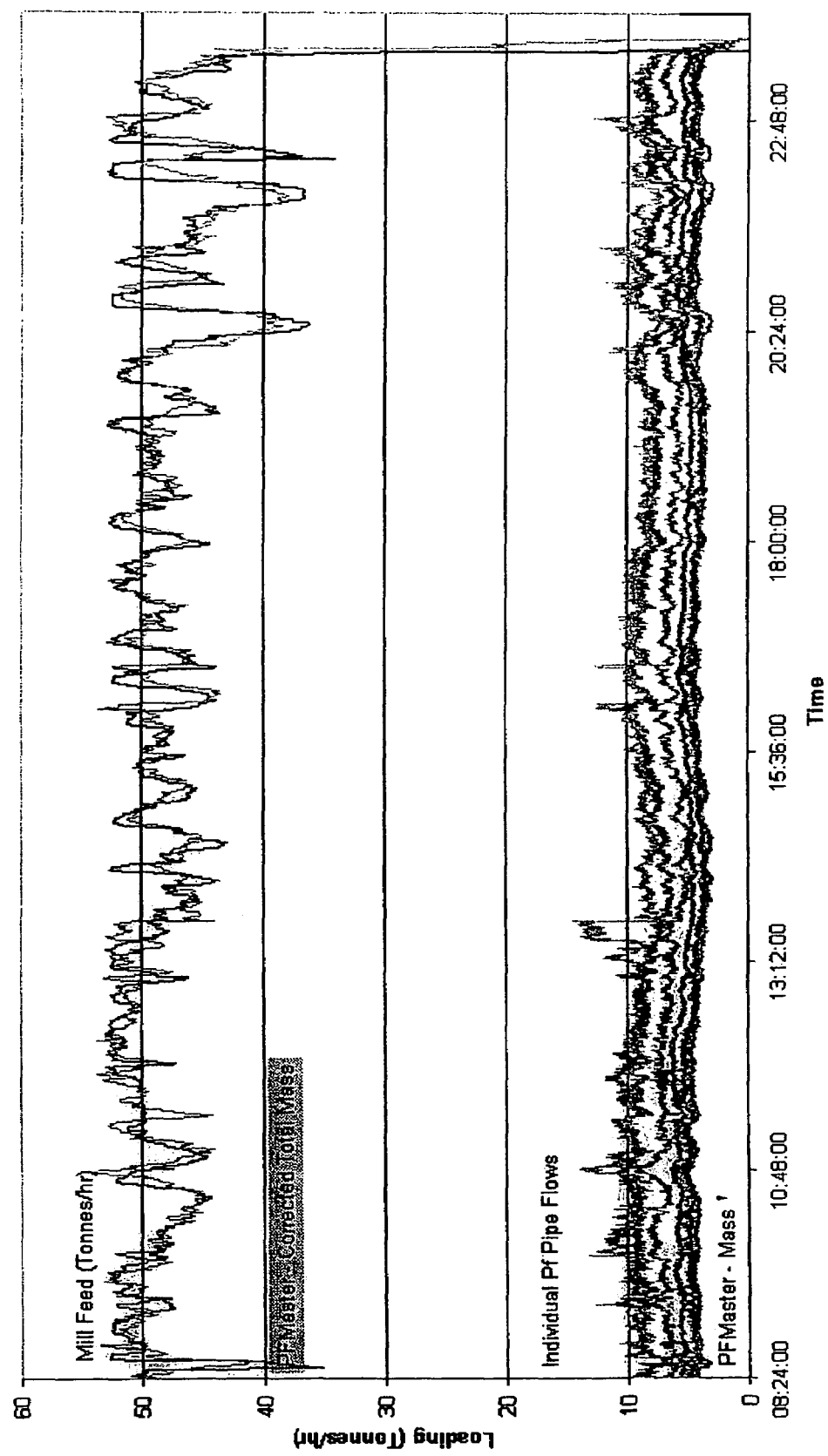

An embodiment of the invention will now be described by way of example with reference to the accompanying drawings in which:

FIG. 1 is a schematic diagram of a power station implementing an embodiment of the invention; and FIG. 2 is a graph of mill feed and total flow as calculated using the embodiment of the invention.

Referring to FIG. 1, at a source location, fuel is loaded onto a conveyor 10 having a load cell for measuring total mass supplied as a function of time supplies fuel to a mill 14 which pulverises the fuel. The pulverised fuel is mixed with air from a blower 16 and supplied to a master conduit 18. There may be multiple mills and blowers and multiple conveyors in a typical installation.

The master conduit 18 supplies fuel to a plurality of (here 6) downstream conduits $20a \ldots 20f$ which supply the fuel to a burner 40 (the conduits may feed separate burners or separate burner compartments).

Each conduit has an associated cross correlator $22a \ldots 22f$ (of which only two are shown for clarity) which each receive signals from a respective pair of spaced apart electrodes $32a \ldots 32f$ and $32a \ldots 32f$ in each conduit and produce at least a measure of flow velocity and a measure of signal level (typically RMS signal level). These signals are supplied, together with the signal from load cell 12 to a processor 50. In a practical implementation, the cross correlators may be combined and may be integrated into the function of the processor. The processor determines relative proportions of substance in each conduit and derives a measure of total quantity flowing based on the signal from the upstream sensor provided by the load cell 12. Essentially, the signal from the upstream load sensor is used to calibrate the signal level measurements repeatedly to enable an absolute measure of substance to be determined from those measurements. However, if the signal from the load cell indicates that the burner has just been stopped or started, then re-calibration is halted and measures of substance flow are derived based on the signal levels and the last calibration. This may tend to drift, but this may be acceptable in a transitional state and in any event provides a better value than that based on the signal from the load cell.

A preferred operating procedure is:

Direct whether flow indicated is less man cut off threshold
If flow below cut-off, loop until flow above cut-off
[To avoid re-adjusting Meter Factor during low or no flow conditions]
When flow increases above cut-off, wait for $T_{wait}$ seconds
[To avoid spurious readings as equipment stabilises]
Start averaging flow over $T_{average}$ seconds
[e.g. by filling circular buffer with samples over $T_{average}$ period and calculate rolling average]
Calculate: Meter Factor(MF)=Mill feed average, over $T_{average}$/PfMeter average (Sum Pf1–Pfn)
[where Pfn is an individual flow reading]
Calculate: Corrected Mass, $Pf_{n(corr)}$=Pfn·MF In the case of a brief drop or glitch in output, the meter suspends recalculation of the rolling average for $T_{wait}$ seconds to reduce the effect of spurious transients.

Other algorithms may be employed, the invention may be applied to measurement of other substances and modifications may be made to the various thresholds and timings discussed depending on the application. Each feature disclosed herein may be independently provided unless otherwise stated.

The invention claimed is:

1. A method of obtaining a plurality of measures of quantity of a substance flowing through a respective plurality of conduits, each of the conduits being supplied from an upstream common source location, the method comprising:
   obtaining an absolute measure of the total quantity of substance flowing past the common source location;
   obtaining relative measures of the proportions of substance flowing through each of the plurality of conduits at respective measurement locations in each conduit downstream of the source location;
   determining measures of the quantities of substance flowing through each of the respective plurality of conduits based on the total quantity of substance flowing past the source location and the relative proportions of substance flowing through each of the plurality of measurement conduits; and
   outputting the determined measures of the quantities of substance flowing through each of the respective plurality of conduits.

2. A computer readable medium with instructions to determine and output a plurality of measures of absolute quantity of substance at a respective plurality of measurement locations in accordance with claim 1.

3. A method of obtaining a plurality of measures of quantity of a substance flowing through a respective plurality of conduits, each of the conduits being supplied from an upstream common source location, the method comprising:
   obtaining a measure of the total quantity of substance flowing past the common source location;
   obtaining relative measures of the proportions of substance flowing through each of the plurality of conduits at respective measurement locations in each conduit downstream of the source location;
   determining measures of the quantities of substance flowing through each of the respective plurality of conduits based on the total quantity of substance flowing past the source location and the relative proportions of substance flowing through each of the plurality of measurement conduits;
   compensating the measurements of quantity flowing in each conduit for delays between measurements of total quantity of substance at the source location and the corresponding quantity of substance passing the downstream measurement locations to provide compensated measures of the quantities of substance flowing through each of the respective conduits; and
   outputting the compensated measures of the quantities of substance flowing through each of the respective plurality of conduits.

4. A method of obtaining a plurality of measures of quantity of a substance flowing through a respective plurality of conduits, each of the conduits being supplied from an upstream common source location, the method comprising:
   obtaining a measure of the total quantity of substance flowing past the common source location;
   obtaining relative measures of the proportions of substance flowing through each of the plurality of conduits at respective measurement locations in each conduit downstream of the source location;
   determining measures of the quantities of substance flowing through each of the respective plurality of conduits based on the total quantity of substance flowing past the source location and the relative proportions of substance flowing through each of the plurality of measurement conduits wherein a short-term absolute value for the quantity of substance in each conduit is derived based on the relative measures of the quantity of substance in each measurement conduit and a predetermined scale; and
   outputting the determined measures of the quantities of substance flowing through each of the respective plurality of conduits.

5. A method according to claim 4, wherein the scale factor is chosen or adjusted based on the measure of the total quantity of substance flowing past the common source location.

6. A method of obtaining a plurality of measures of quantity of a substance flowing through a respective plurality of conduits, each of the conduits being supplied from an upstream common source location, the method comprising:
   obtaining an absolute measure of the total quantity of substance flowing past the common source location;
   obtaining relative measures of the proportions of substance flowing through each of the plurality of conduits at respective measurement locations in each conduit downstream of the source location;
   scaling the absolute measure of quantity of substance based on the relative measures of the proportions of substance flowing through the plurality of conduits to determine measures of the quantities of substance flowing through each of the respective plurality of conduits; and
   outputting the determined measures of the quantities of substance flowing through each of the respective plurality of conduits;
   wherein the sum of the proportions is permitted to fluctuate from unity.

7. A method according to claim 6, further comprising causing the sum of the proportions to tend towards unity.

8. A method according to claim 7, wherein causing the sum of proportions to tend towards unity comprises providing feedback to adjust scale factors applied to relative measurements so that the proportions tend towards unity.

9. A computer readable medium with instructions to determine and output a plurality of measures of absolute quantity of substance at a respective plurality of measurement locations in accordance with claim 6.

10. A method of obtaining a plurality of measures of quantity of a substance flowing through a respective plurality of conduits, each of the conduits being supplied from an upstream common source location, the method comprising:
    determining a plurality of downstream measures of quantity based on scaling an absolute measure of source quantity by relative measures of quantity in the downstream measurement conduits wherein the sum of the quantities measured in the downstream conduits is permitted to deviate from the source quantity based on the delay characteristics of the system; and
    outputting the determined measures of the quantities of substance flowing through each of the respective plurality of conduits.

11. A computer readable medium with instructions to determine and output a plurality of measures of absolute quantity of substance at a respective plurality of measurement locations in accordance with claim 10.

12. A method of obtaining a plurality of measures of quantity of a substance flowing through a respective plurality of conduits, each of the conduits being supplied from an upstream common source location, the method comprising:

deriving a plurality of relative amounts of substance flowing through a plurality of similar measurement conduits from a respective sensor in each conduit, wherein the sensors produce a relatively more accurate measure of relative quantity of substance in each conduit and a relatively less accurate measure of absolute quantity of substance in each conduit;

determining a measure of absolute quantity of substance in each conduit based on the measures of relative quantities and based on adjusting the absolute measures of quantity to correspond to an upstream measure of absolute total quantity of substance measured at the upstream source location; and outputting the determined measures of the quantities of substance flowing through each of the measurement conduits.

13. A method according to claim 12 wherein the upstream measurement of total quantity of substance is temporally filtered.

14. A method according to claim 12 wherein the upstream measure of quantity is used to adjust the measurements of absolute quantity from each measurement conduit while the upstream measurement indicates a steady state flow.

15. A method according to claim 12 wherein, if the upstream measurement indicates a sudden change, adjustment of the downstream measurements is suspended or the effects of the upstream measurement are diminished.

16. A method according to claim 12 wherein the upstream measurement is only used to adjust the downstream measurement if it satisfies a predetermined condition.

17. A method according to claim 16 wherein the predetermined condition comprises a flow rate above a minimum threshold for a predetermined period.

18. A method according to claim 17, wherein the flow rate is at least 25% of a defined "normal" flow.

19. A method according to claim 17 wherein the period is at least five minutes.

20. A method according to claim 12 for use in a pulverised fuel burner, wherein the upstream measurement is derived from a measure of mass of solid fuel prior to the fuel being entrained in a stream of air.

21. A method according to claim 20, wherein the upstream measure is derived from a measure of the mass of fuel supplied to a mill.

22. A computer readable medium with instructions to determine and output a plurality of measures of absolute quantity of substance at a respective plurality of measurement locations in accordance with claim 12.

23. Apparatus for obtaining a plurality of measures of quantity of a substance flowing through a respective plurality of conduits, each of the conduits being supplied from an upstream common source location, the apparatus comprising:

means for obtaining an absolute measure of the total quantity of substance flowing past the common source location;

means for obtaining relative measures of the proportions of substance flowing through each of the plurality of conduits at respective measurement locations in each conduit downstream of the source location;

means for obtaining measures of the quantities of substance flowing through each of the respective plurality of conduits based on the total quantity of substance flowing past the source location and the relative proportions of substance flowing through each of the plurality of measurement conduits.

24. Apparatus for obtaining a plurality of measures of quantity of a substance flowing through a respective plurality of conduits, each of the conduits being supplied from an upstream common source location, the apparatus comprising:

means for obtaining an absolute measure of the total quantity of substance flowing past the common source location;

means for obtaining relative measures of the proportions of substance flowing through each of the plurality of conduits at respective measurement locations in each conduit downstream of the source location;

means for scaling the absolute measure of quantity of substance based on relative measures of proportions of substance flowing through the measurement conduits wherein the sum of the proportions is permitted to fluctuate from unity.

25. Apparatus for obtaining a plurality of measures of quantity of a substance flowing through a respective plurality of conduits, each of the conduits being supplied from an upstream common source location, the apparatus comprising:

means for providing a plurality of downstream measures of quantity based on scaling an absolute measure of source quantity by relative measures of quantity in the downstream measurement conduits wherein the sum of the quantities measured in the downstream quantities is permitted to deviate from the source quantity based on the delay characteristics of the system.

26. Apparatus for obtaining a plurality of measures of quantity of a substance flowing through a respective plurality of conduits, each of the conduits being supplied from an upstream common source location, the apparatus comprising:

means for deriving a plurality of relative amounts of substance flowing through a plurality of similar measurement conduits from a respective sensor in each conduit, wherein the sensors produce a relatively more accurate measure of relative quantity of substance in each conduit and a relatively less accurate measure of absolute quantity of substance in each conduit;

means for producing a measure of absolute quantity of substance in each conduit based on the measures of relative quantities and based on adjusting the absolute measures of quantity to correspond to an upstream measure of absolute total quantity of substance measured at the upstream source location.

27. Apparatus according to claim 26 wherein the upstream measurement is only used to adjust the downstream measurement if it satisfies a predetermined condition.

28. Apparatus according to claim 26 wherein the downstream conduits comprise conduits carrying pulverised fuel-carrying entrained in a gas stream, wherein the upstream measurement is obtained from a measure of mass of fuel prior to the fuel being entrained in the gas stream.

29. Apparatus for obtaining a plurality of measures of quantity of a substance flowing through a respective plurality of conduits, each of the conduits being supplied from an upstream common source location, the apparatus comprising a processor operable to:

obtain an absolute measure of the total quantity of substance flowing past the common source location;

obtain relative measures of the proportions of substance flowing through each of the plurality of conduits at respective measurement locations in each conduit downstream of the source location; and determine measures of the quantities of substance flowing through each of the respective plurality of conduits based on the total quantity of substance flowing past the source location and the relative proportions of substance flowing through each of the plurality of measurement conduits.

30. Apparatus for obtaining a plurality of measures of quantity of a substance flowing through a respective plurality of conduits, each of the conduits being supplied from an upstream common source location, the apparatus comprising a processor operable to:

obtain an absolute measure of the total quantity of substance flowing past the common source location;

obtain relative measures of the proportions of substance flowing through each of the plurality of conduits at respective measurement locations in each conduit downstream of the source location;

scale the absolute measure of quantity of substance based on the relative measures of proportions of substance flowing through the plurality of conduits, wherein the sum of the proportions is permitted to fluctuate from unity, to determine measures of the quantities of substance flowing through each of the respective plurality of conduits.

31. Apparatus for obtaining a plurality of measures of quantity of a substance flowing through a respective plurality of conduits, each of the conduits being supplied from an upstream common source location, the apparatus comprising a processor operable to:

derive a plurality of downstream measures of quantity based on scaling an absolute measure of source quantity by relative measures of quantity in the downstream measurement conduits wherein the sum of the quantities measured in the downstream quantities is permitted to deviate from the source quantity based on the delay characteristics of the system.

32. Apparatus for obtaining a plurality of measures of quantity of a substance flowing through a respective plurality of conduits, each of the conduits being supplied from an upstream common source location, the apparatus comprising a processor operable to:

derive a plurality of relative amounts of substance flowing through a plurality of similar measurement conduits from a respective sensor in each conduit, wherein the sensors produce a relatively more accurate measure of relative quantity of substance in each conduit and a relatively less accurate measure of absolute quantity of substance in each conduit; and determine a measure of absolute quantity of substance in each conduit based on the measures of relative quantities and based on adjusting the absolute measures of quantity to correspond to an upstream measure of absolute total quantity of substance measured at the upstream source location.

33. Apparatus according to claim 32 wherein the upstream measurement is only used to adjust the downstream measurement if it satisfies a predetermined condition.

34. Apparatus according to claim 32 wherein the downstream conduits comprise conduits carrying pulverised fuel entrained in a gas stream, wherein the upstream measurement is obtained from a measure of mass of fuel prior to the fuel being entrained in the gas stream.

35. Apparatus according to claim 32 wherein the processor is operable to temporally filter the upstream measurement of total quantity of substance.

36. Apparatus according to claim 32 wherein the processor is operable to use the upstream measure of quantity to adjust the measurements of absolute quantity from each measurement conduit while the upstream measurement indicates a steady state flow.

37. Apparatus according to claim 32 wherein, if the upstream measurement indicates a sudden change, the processor is operable to suspend adjustment of the downstream measurements or to diminish the effects of the upstream measurement.

38. Apparatus according to claim 32 wherein the processor is operable only to use the upstream measurement to adjust the downstream measurement if it satisfies a predetermined condition.

39. Apparatus according to claim 38 wherein the predetermined condition comprises a flow rate above a minimum threshold for a predetermined period.

40. Apparatus according to claim 39, wherein the flow rate is at least 25% of a defined "normal" flow.

41. Apparatus according to claim 39 wherein the period is at least five minutes.

42. Apparatus according to claim 32 for use in a pulverised fuel burner, wherein the processor is operable to derive the upstream measurement from a measure of mass of solid fuel prior to the fuel being entrained in a stream of air.

43. Apparatus according to claim 42, wherein the processor is operable to derive the upstream measure from a measure of the mass of fuel supplied to a mill.

* * * * *